(12) United States Patent
Albizuri

(10) Patent No.: US 6,845,966 B1
(45) Date of Patent: Jan. 25, 2005

(54) GAS VALVE WITH LINEAR REGULATION FOR GAS BURNERS

(76) Inventor: Iñigo Albizuri, Avda. Alava, 3, 20550 Aretxabaleta (ES)

( * ) Notice: Subject to any disclaimer, the term of this patent is extended or adjusted under 35 U.S.C. 154(b) by 0 days.

(21) Appl. No.: 10/782,696

(22) Filed: Feb. 18, 2004

(30) Foreign Application Priority Data

Dec. 17, 2003 (ES) .......................................... 200302988

(51) Int. Cl.[7] ............................................... F16K 5/16
(52) U.S. Cl. ................... 251/207; 137/599.17; 251/183
(58) Field of Search ................................ 251/205–209, 251/180–184, 309–312; 137/599.17

(56) References Cited

U.S. PATENT DOCUMENTS

| | | | |
|---|---|---|---|
| 3,682,200 A | * | 8/1972 | Deve ..................... 137/625.47 |
| 4,723,567 A | * | 2/1988 | Phlipot et al. ......... 137/315.17 |
| 5,219,149 A | * | 6/1993 | Combeau ................... 251/309 |
| 5,488,969 A | * | 2/1996 | King et al. ..................... 137/8 |
| 5,934,320 A | * | 8/1999 | O'Reilly et al. ........ 137/625.21 |
| 6,520,481 B2 | * | 2/2003 | Harneit ........................ 251/207 |

FOREIGN PATENT DOCUMENTS

GB 2015702-a * 12/1979

* cited by examiner

*Primary Examiner*—Paul J. Hirsch
(74) *Attorney, Agent, or Firm*—The Kline Law Firm

(57) ABSTRACT

A gas valve with linear regulation for gas burners that comprises a valve body (10), said valve body (10) comprising a gas chamber (15), an inlet conduit (16) and an exit conduit (14) communicating with said gas chamber (15); a cone (13) housed inside said gas chamber (15) so that a lower part (22) of said gas chamber (15) remains empty; and a rotating transmission shaft (17) via which said cone (13) rotates. The inlet conduit (16) is a diagonal channel communicating with the lower part (22) of the gas chamber (15), the lower chamber (21) of the cone (13) communicating with said lower part (22) of the gas chamber (15). The exit conduit (14) comprises a connection hole (1) communicating with the gas chamber (15).

4 Claims, 3 Drawing Sheets

GAS VALVE WITH LINEAR REGULATION FOR GAS BURNERS

TECHNICAL FIELD

The present invention relates to valves for gas burners used for cooking and, more specifically, valves that produce a linear regulation of the flow of gas.

PRIOR ART

Gas burners are known, such as those used for barbecues, in which the use of a linearly regulated gas flow is important, as well as a guaranteed minimum gas flow. GB 2015702 A discloses a gas valve which comprises a valve body and a cone which allows a gradual increase in the flow of gas, said cone having a lower chamber and a plurality of holes and grooves which communicate with said lower chamber.

U.S. Pat. No. 6,520,481 B2 discloses a gas valve that comprises a valve body, said valve body comprising a gas chamber, an inlet conduit communicating with said gas chamber, and an exit conduit communicating with said gas chamber, a cone housed inside said gas chamber so that a lower part of said gas chamber remains empty, and said cone having a maximum flow hole, a diagonal regulation groove communicating with said maximum flow hole, a minimum flow hole, a minimum connection radial groove communicating with said minimum flow hole, and a lower chamber, the maximum flow hole, the diagonal regulation groove and the minimum flow hole communicating with said lower chamber; and a rotating transmission shaft via which said cone rotates.

The inlet conduit is separated from the gas chamber by a partition, which has at least one hole, which communicates said inlet conduit with said gas chamber.

The exit conduit communicates with the gas chamber via a diagonal channel communicating with the lower part of said gas chamber, the lower chamber of the cone communicating with said lower part of the gas chamber. Said diagonal channel has a seal at its end to prevent the gas from leaking out of the valve body.

DISCLOSURE OF THE INVENTION

The object of the invention is to provide a gas valve with linear regulation for gas burners, which improves some of the features of the gas valves of the prior art.

The gas valve of the invention comprises a valve body, said valve body comprising a gas chamber, an inlet conduit communicating with said gas chamber, and an exit conduit communicating with said gas chamber; a cone housed inside said gas chamber so that a lower part of said gas chamber remains empty, said cone having a maximum flow setting and a minimum flow setting, and said cone having a maximum flow hole, a diagonal regulation groove communicating with said maximum flow hole, a minimum flow hole, a minimum connection radial groove communicating with said minimum flow hole, and a lower chamber, the maximum flow hole, the diagonal regulation groove and the minimum flow hole communicating with said lower chamber; and a rotating transmission shaft via which said cone rotates.

The inlet conduit of the valve is a diagonal channel communicating with the lower part of the gas chamber, the lower chamber of the cone communicating with said lower part of the gas chamber, and the exit conduit of the valve comprises a connection hole with the gas chamber, said connection hole being aligned with the maximum flow hole when the cone is in the maximum flow setting and said connection hole being aligned with the minimum flow hole when the cone is in the minimum flow setting.

As the inlet conduit of the valve is a diagonal channel, a seal is not required to prevent the gas from leaking out of the valve body, since the gas flows directly to said diagonal channel.

These and other advantages and features of the invention will be made clear in view of the detailed embodiment of the invention.

DETAILED EXPLANATION OF THE INVENTION

Figure 1:
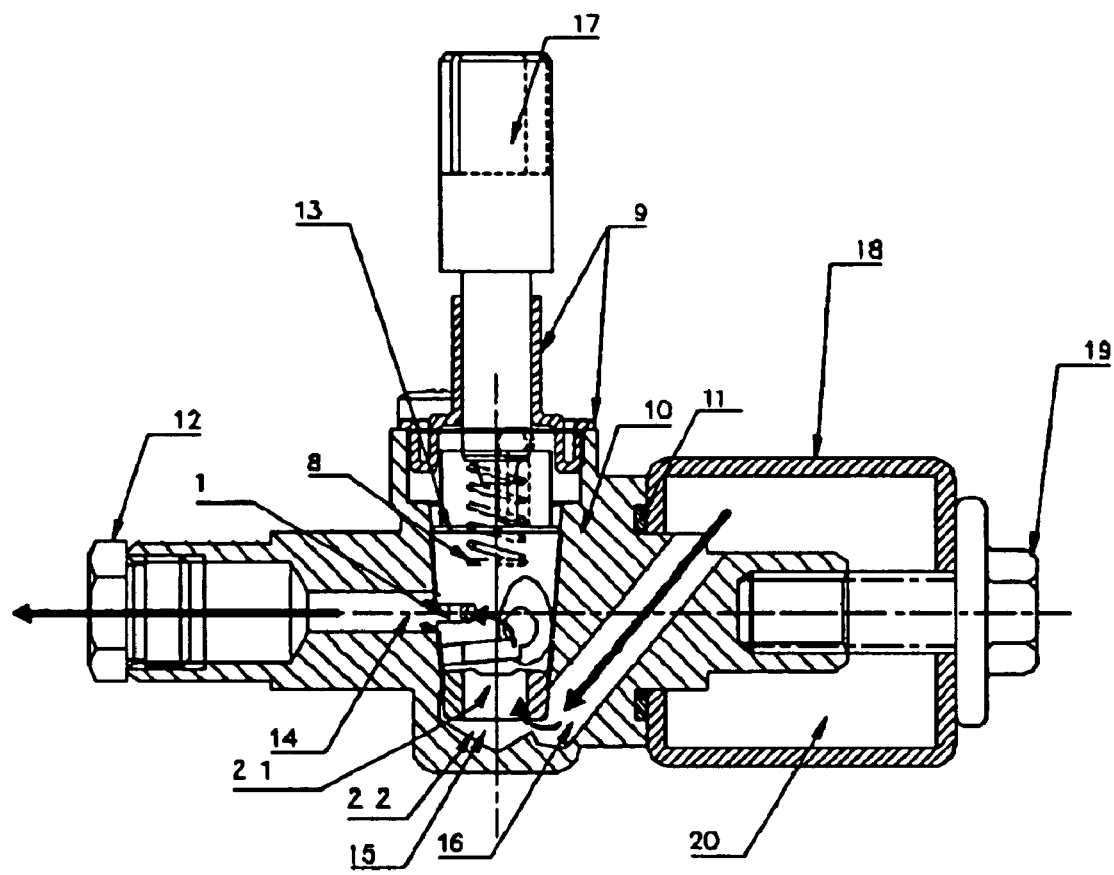
FIG. 1 is a profile section view of an embodiment of the invention.

With reference to FIG. 1, the gas valve of the invention comprises a valve body 10, said valve body 10 comprising:

a gas chamber 15, an inlet conduit 16 communicating with said gas chamber 15, and an exit conduit 14 communicating with said gas chamber 15.

Figure 2:
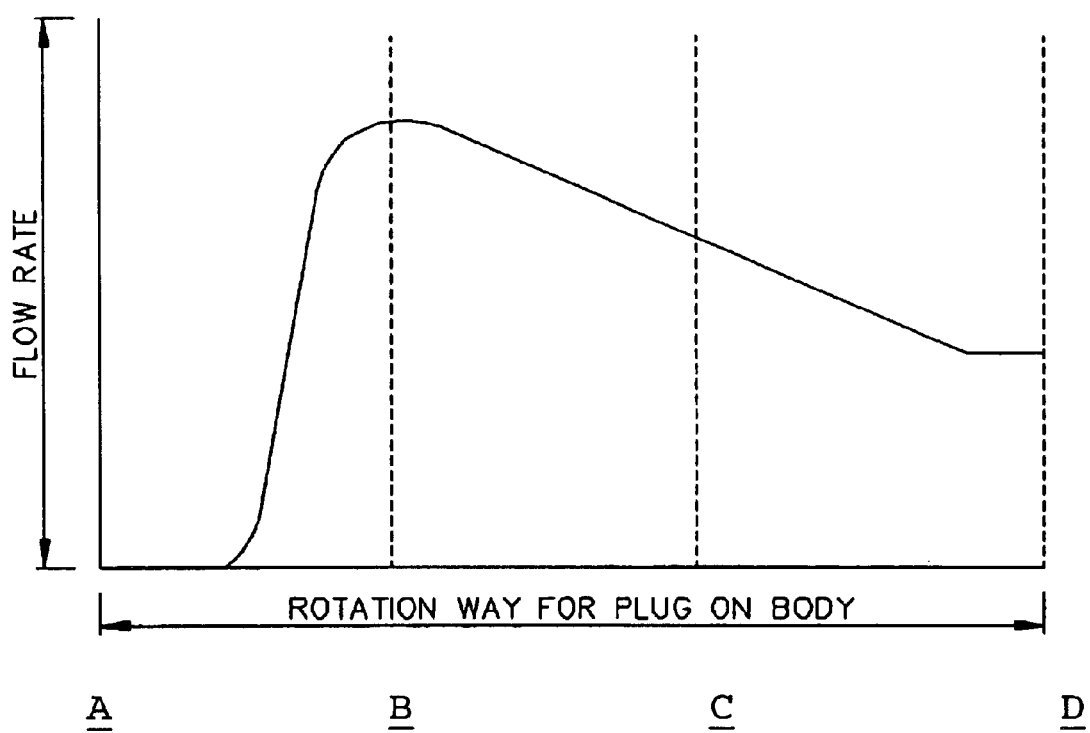
FIG. 2 is a drawing showing the flow rate measurement with the different settings of the valve cone.

The valve of the invention also has a cone 13 housed inside said gas chamber 15 so that a lower part 22 of said gas chamber 15 remains empty, said cone 13 having, as shown in FIG. 2, a maximum flow setting B and a minimum flow setting D. The cone 13 comprises:

a maximum flow hole 2, a diagonal regulation groove 6 communicating with said maximum flow hole 2, a minimum flow hole 5, a minimum connection radial groove 3 communicating with said minimum flow hole 5, and a lower chamber 21, the maximum flow hole 2, the diagonal regulation groove 6 and the minimum flow hole 5 communicating with said lower chamber 21.

In addition, the valve includes a rotating transmission shaft 17 via which said cone 13 rotates, a cap 9 fixed to the valve body 10, said cap 9 having a hole in which the shaft 17 is inserted, and it also has a spring 8.

The inlet conduit 16 of the valve is a diagonal channel communicating with the lower part 22 of the gas chamber 15, the lower chamber 21 of the cone 13 communicating with said lower part 22 of the gas chamber 15. As shown in FIG. 1, the gas enters said inlet conduit 16 via a gas chamber 20 in the form of a tube 18 which is fixed to the valve body 10 via a fixing screw 19. The joint between the valve body 10 and the tube 18 is made airtight by the use of gasket 11. As can be seen in FIG. 1, the valve also contains a flow nozzle 12.

Figure 3:
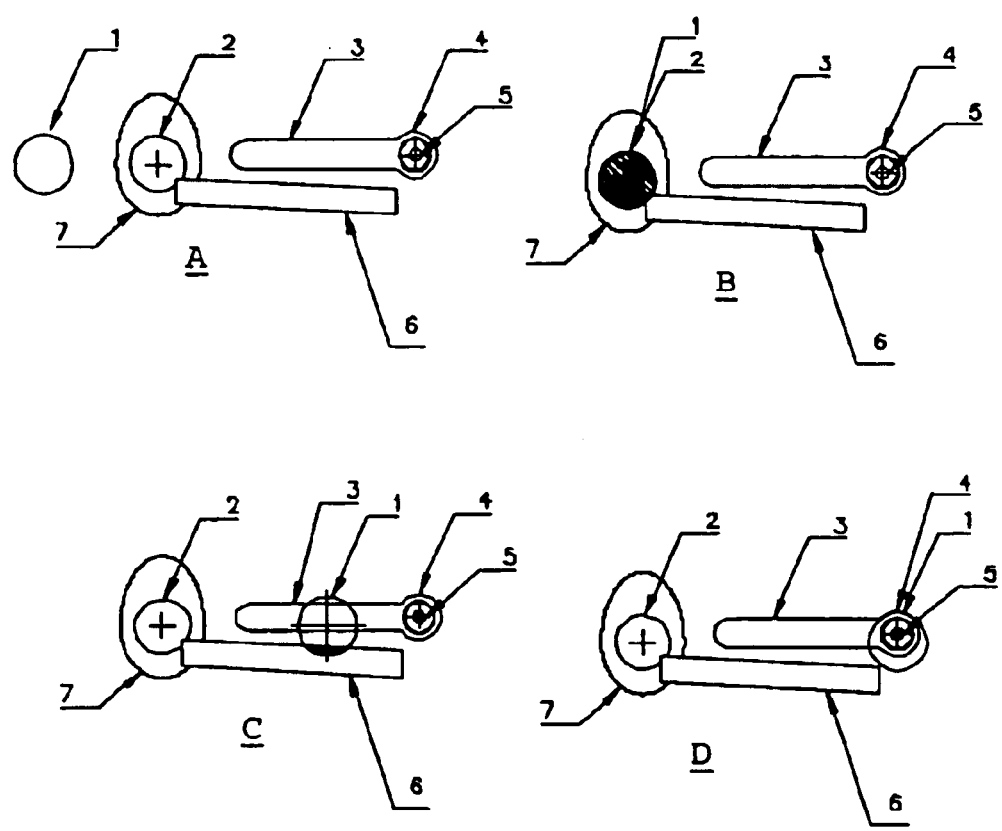
FIG. 3 shows the connection hole of the exit conduit of the valve of the invention and the holes and grooves of the cone of the valve of the invention, corresponding to four different settings of said cone.

The exit conduit 14 comprises a connection hole 1 communicating with the gas chamber 15. FIG. 3 shows said connection hole 1, and the holes 2 and 5 and grooves 3 and 6 of the cone 13 of the valve of the invention, corresponding to four different settings of said cone 13.

In a first setting A of the cone 13, the valve is closed. The second setting B of the cone 13 corresponds to the maximum flow setting, as the connection hole 1 is aligned with the maximum flow hole 2. In a third setting C of the cone 13, the connection hole 1 is coincident with the radial groove 3 of the cone 13, while at the same time is partially coinciding with the diagonal groove 6, the total flow being the sum of the gas flowing through both grooves 3 and 6. The fourth setting D of the cone 13 corresponds to the minimum flow setting, as the connection hole 1 coincides with the minimum flow hole 5.

FIG. 2 shows the flow rate for the different settings of the cone 13. The corresponding flow rate at settings A, B, C and D is indicated.

As can be seen in FIGS. 1 and 3, the maximum flow hole 2 of the cone 13 has a substantially trunco-conical surface that forms a chamfer 7. The use of said chamfer 7 avoids having any sharp edges in the cone 13. Also, said substantially trunco-conical surface improves the linearity of the gas flow regulation in two ways: firstly, by enabling the grease required to lubricate the cone 13 to be positioned, thus avoiding any possible obstructions to the flow of gas, and secondly, by increasing the robustness of the linear regulation solution, since the height differences that may be between the cone 13 and the valve body 10 due to their machining process are absorbed, so that the flow of gas is maintained regardless of the manufacturing process.

Figure 4:
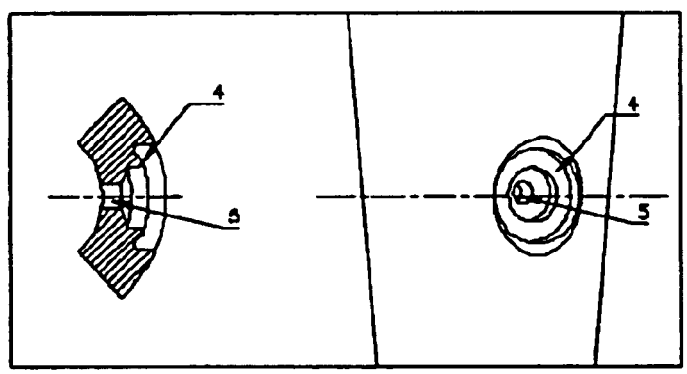
FIG. 4 shows a section and perspective view of an embodiment of the minimum flow hole of the cone of the valve of the invention.

As can be seen in FIG. 4, the minimum flow hole 5 has a grease retention ring 4. Said grease retention ring 4 stops the grease from the valve from falling in the minimum flow hole 5, which could obstruct the flow of gas.

As can be seen in FIG. 1, there is not any kind of separation between the connection hole 1 of the exit conduit 14 and the gas chamber 15. Said connection hole 1 is in fact the one which directly communicates the exit conduit 14 and the gas chamber 15.

What is claimed is:

1. A gas valve with linear regulation for gas burners, which comprises:
   a valve body, said valve body comprising
   a gas chamber,
   an inlet conduit communicating with said gas chamber, and
   an exit conduit communicating with said gas chamber;
   a cone housed inside said gas chamber so that a lower part of said gas chamber remains empty, said cone having a maximum flow setting and a minimum flow setting, and said cone comprising
   a maximum flow hole,
   a diagonal regulation groove communicating with said maximum flow hole,
   a minimum flow hole,
   a minimum connection radial groove communicating with said minimum flow hole, and
   a lower chamber, the maximum flow hole, the diagonal regulation groove and the minimum flow hole communicating with said lower chamber; and
   a rotating transmission shaft via which said cone rotates; wherein
   said inlet conduit is a diagonal channel communicating with the lower part of the gas chamber, the lower chamber of the cone communicating with said lower part of the gas chamber; and
   said exit conduit comprises a connection hole communicating with the gas chamber, said connection hole being aligned with the maximum flow hole when the cone is in the maximum flow setting and said connection hole being aligned with the minimum flow hole when the cone is in the minimum flow setting.

2. The valve according to claim 1, wherein the maximum flow hole of the cone has a substantially trunco-conical surface that forms a chamfer.

3. The value according to claim 1, wherein the minimum flow hole has a grease retention ring.

4. The value according to claim 1, wherein there is not any kind of separation between the connection hole of the exit conduit and the gas chamber.

* * * * *